(12) United States Patent
Carr et al.

(10) Patent No.: US 6,846,087 B2
(45) Date of Patent: Jan. 25, 2005

(54) MICROMIRROR HAVING COUNTERBALANCING STRUCTURES AND METHOD FOR MANUFACTURING SAME

(75) Inventors: Dustin W Carr, Pittstown, NJ (US); Christopher John Frye, Orefield, PA (US); Timofei Nikita Kroupenkine, Warren, NJ (US); Victor Alexander Lifton, Bridgewater, NJ (US); Michael Patrick Schlax, Davenport, IA (US); Alex T Tran, Madison, NJ (US); Joseph J Vuillemin, Newton Upper Falls, MA (US)

(73) Assignees: Lucent Technologies Inc., Murray Hill, NJ (US); Agere Systems Inc., Allentown, PA (US)

( * ) Notice: Subject to any disclaimer, the term of this patent is extended or adjusted under 35 U.S.C. 154(b) by 105 days.

(21) Appl. No.: 10/208,458

(22) Filed: Jul. 30, 2002

(65) Prior Publication Data

US 2004/0021963 A1 Feb. 5, 2004

(51) Int. Cl.[7] .............................................. G02B 7/182
(52) U.S. Cl. ...................... 359/846; 359/838; 359/877
(58) Field of Search ................................. 359/846, 838, 359/871–877, 883–884, 296; 310/12–13; 250/206.1; 385/18

(56) References Cited

U.S. PATENT DOCUMENTS

| 4,343,333 A | * | 8/1982 | Keister ........................ 138/125 |
| 6,074,475 A | * | 6/2000 | Harrison et al. .............. 385/18 |
| 6,720,682 B2 | * | 4/2004 | Hatam-Tabrizi et al. ...... 310/12 |

* cited by examiner

Primary Examiner—Mohammad Sikder

(57) ABSTRACT

A multilayer micromirror structure that exhibits substantially no form change as a result of a given change in temperature is disclosed. A reflective layer is disposed on a substrate layer, and a counterbalancing structure is disposed on the structure in a way such that a neutral plane is located at a predetermined position relative to the substrate layer and the reflective layer. When forces are exerted at the neutral plane of such a structure, the structure attains a predetermined geometric form. A method of manufacture is disclosed wherein a substrate is etched to define a desired structure and a conformal layer of a masking material is deposited onto the etched substrate. Further etching exposes portions of the substrate and silicon is deposited to achieve another desired structure. Excess material is etched away to free the finished structure and a reflective layer is deposited onto the surface of the structure.

10 Claims, 12 Drawing Sheets

ΔT = -100°C
MIRROR THICKNESS = 2μm,
BOTTOM EXT. HEIGHT = 0μm

MICROMIRROR HAVING COUNTERBALANCING STRUCTURES AND METHOD FOR MANUFACTURING SAME

FIELD OF THE INVENTION

The present invention relates to multilayer structures and, more particularly, multilayer micromirrors.

BACKGROUND OF THE INVENTION

Many structures useful in microelectronic mechanical system (MEMS) devices are produced by layering one or more layers of a material onto a substrate layer, with each such layer possessing potentially different thermo-mechanical properties. For example, small, flat mirrors (also known as micromirrors) used in some MEMS devices are formed by layering a reflective metal film (such as gold or aluminum) onto a silicon substrate layer. The different layers of these mirrors may have significantly different coefficients of thermal expansion (CTEs). Due to this difference in CTEs, such mirrors will typically exhibit a change in their geometrical form (e.g., bow, twist, etc) in response to a change in temperature. This change in form is directly attributable to the stresses that result when the joined layers expand/contract at different rates.

For example, FIGS. 1a and 1b show a three dimensional view and a cross-sectional view, respectively, of a prior art layered structure 101 such as, for example, a micromirror used in optical networking devices. One layer 103 of a reflective material (e.g., gold) with one coefficient of thermal expansion (CTE) is disposed on a substrate layer 102 of another material (e.g., silicon) with a second, different CTE. As the temperature of the structure changes, the difference in CTEs causes a different rate of expansion or contraction (depending upon whether the temperature rises or falls, respectively) of the two layers 103 and 102 relative to each other. Stresses result along the surface 104 where the two layers are joined causing the geometric form of the structure to change (e.g., bend or twist). Geometric form change, as used herein, is defined as any change in the geometric form of the structure that causes the geometric form of the reflective layer of material to detrimentally deform from a desired form. Such geometric form deformation, exemplified by the bending in FIG. 1c, is often undesirable.

In many situations, it is desirable to be able to control or even prevent the geometrical form change that results from the aforementioned stresses. One currently used method of preserving the flatness of micromirrors, illustrated in FIGS. 2a and 2b, compensates for the aforementioned stresses by symmetrically disposing a layer of metal onto each side of the silicon substrate. In this structure, a first layer 203 of a material (e.g., gold) is disposed on one side of a substrate. A second layer 204 of the same material as layer 203 is disposed on the opposite side of substrate 202. In principle, the stresses along layer 206 in FIG. 2b where the substrate 202 is joined with layer 203 will be counterbalanced by the stresses along layer 205 in FIG. 2b where the substrate 202 is joined with layer 204. Therefore, in theory, the stresses that result from the differences in CTE would not lead to the deformation exemplified in FIG. 1c. Such a structure, in theory, would experience identical stresses on each side of the substrate when a temperature change occurs. Therefore, the stresses developed upon a change would not result in a change in the geometric form of the structure.

However, this stress-compensation method has substantial drawbacks. Manufacturing the layered structures of FIGS. 2a and 2b can be difficult, requiring precise control over the physical properties of layers 203 and 204. Variation in, for example, the thickness, density or homogeneity of these layers, which are, for example 10 to 100 nanometers in thickness, could result in unequal stresses between the two layers and the substrate 202 and, as a result, could cause a geometric form change, such as that exemplified in FIG. 1c. Even if the physical properties of the two layers are identical, other problems can arise over time. For example, the stresses induced between layers 203 and 204 and the substrate layer 202 during a temperature variation could cause, over a period of weeks or even months, a change in the crystalline structure of one or more of the layers in the structure. This change, in turn, can lead to a variation in the stresses between layers 203 and 204 and the substrate 202. An imbalance between the counterbalancing stresses on surfaces 205 and 206 in FIG. 2b will result and the geometric form of the layered structure will change in geometric form. In the example of multi-layered micromirrors, this cause of change in geometric form is of particular concern because it may occur after an optical device has been placed in operations. Thus, great expense and time are often involved in removing the device from operations and then identifying and correcting the problem.

Therefore, there remains a need to provide a multilayer micromirror structure that exhibits substantially no form change as a result of a given change in temperature.

SUMMARY OF THE INVENTION

We have invented a layered structure with a first substrate layer, a second layer disposed on the substrate layer, and a counterbalancing structure disposed on the original structure in a way such that a so-called neutral plane of the combined structure is located at a predetermined position relative to the first substrate layer and the second layer. When forces (e.g., those resulting from stresses caused by a temperature change) are exerted at the neutral plane of such a structure, the structure attains a predetermined geometric form. In accordance with the invention, the geometric form of the structure may remain unchanged as a result of the aforementioned stresses, or a predetermined type or amount of form change may result. In one embodiment, the counterbalancing structure may be disposed upon the perimeter of the original structure as a contiguous ring around that perimeter. Alternatively, in another embodiment, the counterbalancing structure can be a set of several structures disposed symmetrically along the perimeter of the original structure.

To manufacture the structure of the present invention, a silicon-on-insulator (SOI) wafer is etched to define at least one desired structure such as, for instance, a mirror substrate or a counterbalance structure. A conformal layer of a masking material, such as silicon oxide material is deposited onto the etched SOI. Vias are etched into the conformal silicon oxide layer to expose desired portions of the SOI wafer and polysilicon is deposited over a predefined area to achieve another predefined, desired structure. Once again, this desired structure may be a counterbalance structure or a mirror substrate. Excess silicon and silicon oxide are etched away to free the finished structure and a metallized reflective layer is deposited onto the surface of the micromirror.

BRIEF DESCRIPTION OF THE DRAWING

FIG. 1b shows a cross-sectional view of the structure of FIG. 1a;

FIG. 2b shows a cross-sectional view of the structure of FIG. 2a;

FIG. 4b shows a cross-sectional view of the structure of FIG. 4a;

DETAILED DESCRIPTION OF THE INVENTION

Figure 1A:
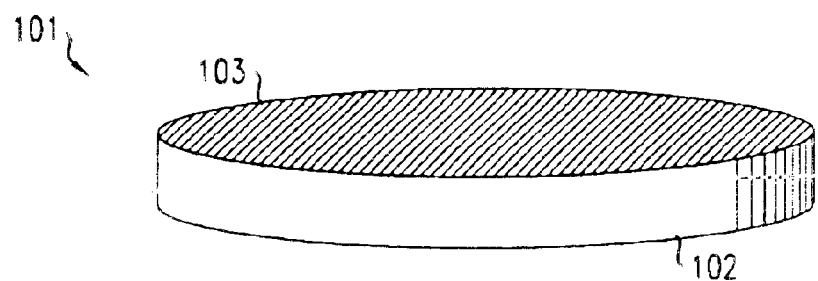
FIG. 1a shows a prior art layered micromirror structure with a reflective coating disposed on one side of a substrate.
Figure 1B:
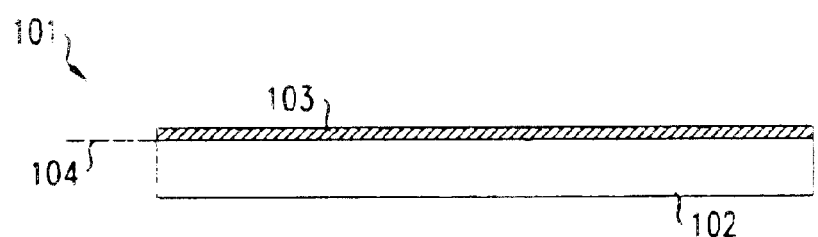
Figure 3:
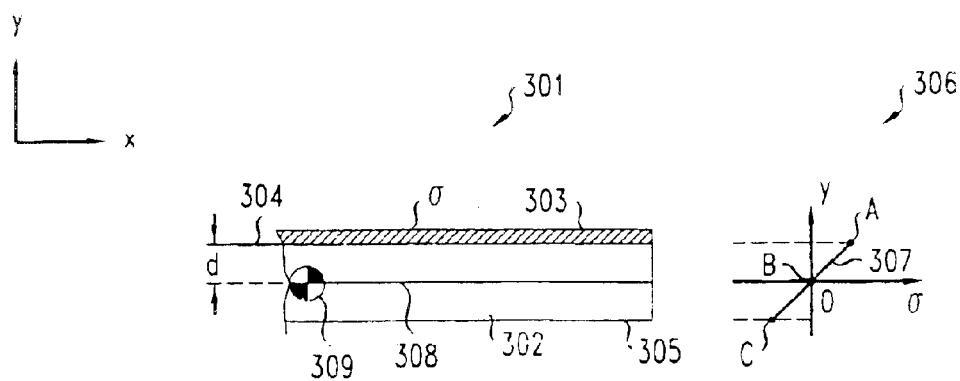
FIG. 3 shows the structure of FIG. 1a and a graph of the stresses that exist in the structure as the depth into the structure increases.

FIG. 3 shows a portion of a structure similar to the structure of FIG. 1a. As shown in graph 306, it is known that a stress σ caused by a temperature change of the structure 301 (e.g., −200° C.) varies substantially linearly as the depth d in substrate 302 increases. Line 307 on graph 306 represents the stress experienced at different levels (represented by the y-axis of graph 306) within the substrate 302 due to such a given temperature change of the structure. Specifically, graph 306 shows the maximum positive stress, represented by point A, occurs at the surface 304 where layer 303 is joined to substrate 302. This graph also shows that the maximum negative stress for the given temperature change, represented by point C, occurs at the surface 305 of the substrate opposite from surface 304. With a different sign of a temperature change (e.g., +200° C. instead of −200° C.), the maximum negative stress would be at the surface 304 and the maximum positive stress would occur at surface 305.

For the structure of FIG. 3, a bending moment is created as a result of this stress. A bending moment is defined as the tendency to cause a rotation about a point or axis. In general, the bending moment about a particular point in structure 301 is proportional to the magnitude of the stress at surface 304 multiplied by the distance d of the stress from that point. This bending moment due to the aforementioned stress causes the curvature proportional to that bending moment resulting form a temperature change. Expressed as an equation, bending moment M is defined as:

$$M \square K \square (d*\sigma) \qquad \text{(Equation 1)}$$

where K is the curvature force experienced by the structure and M is the bending momentum of the structure. In the present case a force at surface 304, which in the y-direction is a distance d from the center of mass 309, will cause a bending moment about that center of mass 309. For a significant temperature change, a curvature of structure 301 with a significant radius of curvature will result.

Referring once again to FIG. 3, graph 306 shows that, since plane 308 is at the y-axis coordinate of the center of mass 309, that plane 308 will experience no stress, as represented by point B on graph 306. Additionally, referring to Equation 1, since this plane 308 is a distance d=0 from the center of mass 309, a force exerted as this plane will result in no bending moment or curvature of structure 301. The plane 308 is located, for a substrate 302 of a homogeneous material, at the y-component of the center of mass 309 of the layered structure 301. One skilled in the art will recognize that plane 308, referred to herein as "neutral plane," will not necessarily be arranged in a "plane" but will, rather, usually be a more complex locus of neutral points defined at each point in the substrate by Equation 2 and Equation 3 below. As used herein, the term "neutral plane" is intended to refer to that locus of neutral points.

Figure 1C:
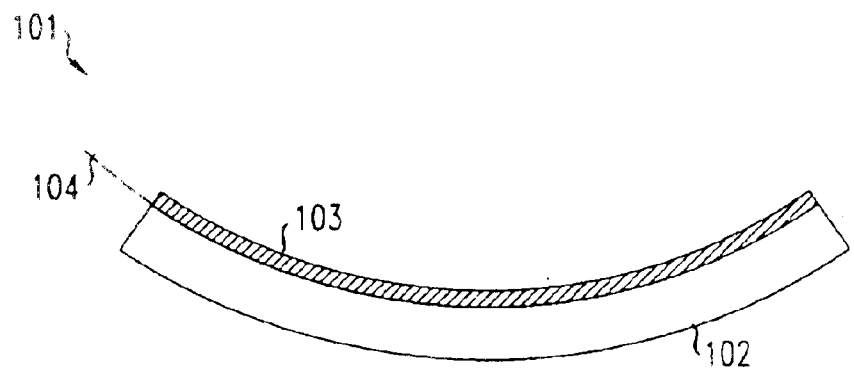
FIG. 1c shows the effect of a temperature change on the structure of FIG. 1b.
Figure 2A:
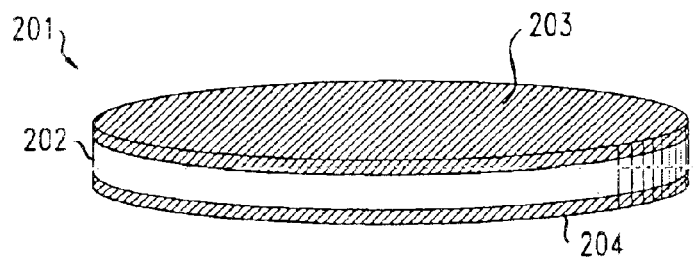
FIG. 2a shows a prior art layered micromirror structure with a reflective coating disposed on both sides of a substrate.
Figure 2B:
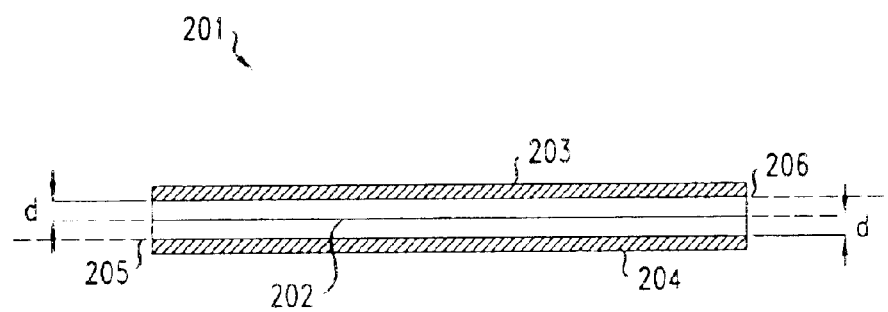
Figure 4A:
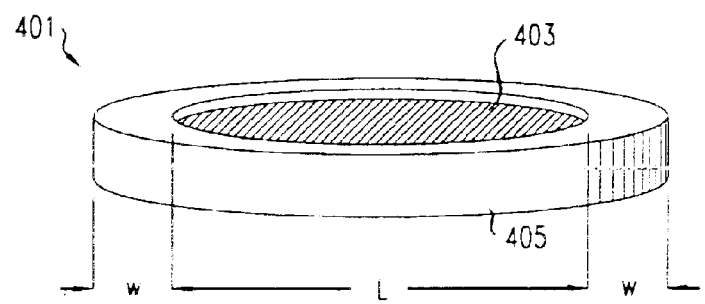
FIG. 4a shows a layered micromirror structure with a counterbalancing structure disposed along the perimeter of the mirror structure.
Figure 4B:
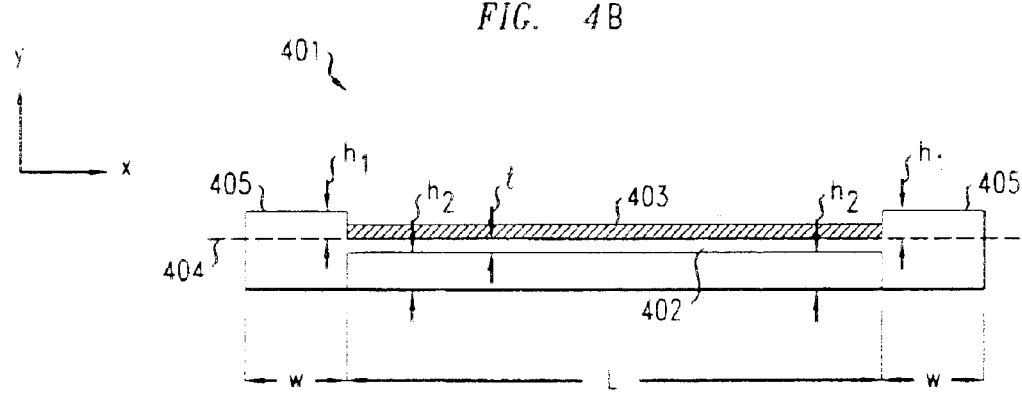

FIGS. 4a and 4b show a first embodiment in accordance with the principles of the present invention whereby the stress-induced bending of FIG. 1c is ameliorated by effectively creating the situation wherein d in FIG. 3 and Equation 1 is equal to zero. Specifically, counterbalancing structure 405 is disposed in a predetermined arrangement, illustratively a ring as shown in FIG. 4a, around substrate 402 and a reflective mirror of diameter L. The reflective mirror may illustratively be a reflective surface fashioned out of a single layer of a metallic or nonmetallic reflective material or, alternatively, may be a reflective surface fashioned by disposing multiple layers of one or more materials onto substrate 402. Illustratively, structure 405 of width w is fashioned from the same material (e.g., silicon) as substrate 402. Referring to FIG. 4b, a portion of the structure 405 in FIG. 4b extends above the top of the substrate 402 a distance $h_1$ and another portion extends below the bottom of the substrate 402 a distance $h_2$. By varying width w, height $h_1$ and height $h_2$, as discussed below, the total center of mass of structure 401 can be made to be located in a predetermined location. Thus, neutral plane 404 can also be made to be located at a predetermined, desired level in the y-direction. Specifically, if the neutral plane is located at the surface where layer 403 and substrate 402 are joined, the curvature and bending momentum defined by Equation 1 will be of zero magnitude and, as a result, the stresses that are caused by a change in temperature will not result in geometric form change of structure 401.

As previously discussed, the neutral plane will be located at the center of mass of the structure as long as the same, homogenous material is used for the substrate and counterbalance structures. For structures where different materials are used for different components, the neutral plane will be located at the modulus-weighted mass centroid, defined by the equation:

$$\hat{y} = \frac{\sum_{i=1}^{n} \overline{y}_i E_i A_i}{\sum_{i=1}^{n} E_i A_i} \quad \text{(Equation 2)}$$

where $\hat{y}$ is the y-coordinate of modulus weighted mass centroid, $E_i$ are the elastic moduli of the different materials, $A_i$ are the surface areas of the different materials and $\overline{y}_i$ is defined by the following relationship:

$$\overline{y}_i = \frac{1}{A_i} \int_{A_i} y \, dA \quad \text{(Equation 3)}$$

For example, a micromirror with a diameter (L in FIGS. 4a and 4b) of 875 µm may be fabricated, as further discussed below, by disposing either a gold (CTE of $14.3 \times 10^{-6}/°$ C.) or aluminum (CTE of $23.0 \times 10^{-6}/°$ C.) reflective surface 403 of 800 Angstroms (Å) in thickness upon a silicon substrate 402 (CTE of $2.5 \times 10^{-6}/°$ C.) with a thickness of 3 µm. The result of this large thickness of the substrate 402 relative to the reflective coating 403 thickness is that thickness t in FIG. 4b is essentially the same as the thickness of the substrate 402. A silicon counterbalance ring 405 of dimensions w=100 µm, $h_1$=9.6 µm, and $h_2$=2 µm is disposed around the mirror portion of the structure. The result of these dimensions is that the neutral plane 404 will be located as discussed above such that distance d in Equation 1 is essentially zero and the radius of curvature of the structure that results from geometric form change is approximately 86 meters. For these dimensions of the structure, such a large radius of curvature means the structure is essentially flat. Therefore, for an illustrative temperature change of −200° C., the curvature (K) and bending momentum (M) of Equation 1 are effectively of zero magnitude and, as a result, the stresses caused by the temperature change will not result in substantial geometric form change of the structure 401.

The aforementioned dimensions of the counterbalance ring 405 are only representative in nature. Other dimensions will result in the same advantageous positioning of the neutral plane. For example, if the thickness of substrate 402 is 1 µm and the width, w, of the counterbalance ring remains 100 µm, a top extension $h_1$ of 3.3 µm and a bottom extension $h_2$ of 1 µm will achieve a similarly large radius of curvature for the aforementioned temperature change. Similarly, for a substrate 402 of thickness 2 µm, a top extension of $h_1$ of 6.7 µm and a bottom extension $h_2$ of 2 µm will lead to a similarly advantageous result.

Figure 5:
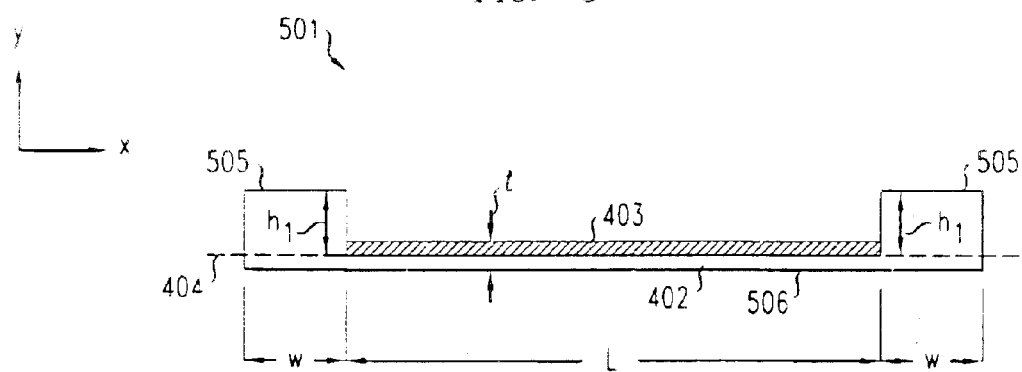
FIG. 5 shows a layered micromirror structure with a counterbalancing structure with a zero bottom extension height disposed along the perimeter of the mirror structure.

FIG. 5 shows another embodiment of the present invention wherein a ring, similar to that shown in FIG. 4a, is used as a counterbalancing structure 505 such that the neutral plane is once again located at plane 404. However, in this embodiment, $h_2$ in FIG. 4b has been set to zero, creating a structure 501 with a flat bottom surface 506. Such a structure may be desirable, especially when the overall dimensions of the structure 501 are very small, as it is often easier to form such structures by performing most steps (e.g., etching) on only one side of the structure.

Figure 6:
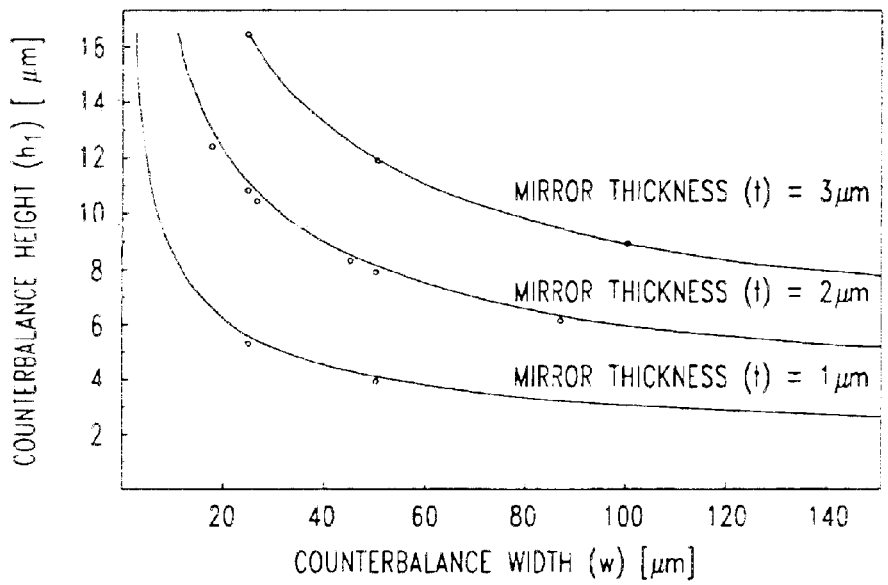
FIG. 6 shows a graph of counterbalance height as a function of counterbalance width for the structure of FIG. 5.

FIG. 6 shows a graph of the counterbalance height ($h_1$ in FIG. 5), necessary to achieve a silicon structure with no geometric form change, as a function of the counterbalance width (w in FIG. 5). These graphs conform to the following approximate relationship:

$$h_1 \approx \frac{5t}{4} \sqrt{1 + \frac{(L/2)}{w}} \quad \text{(Equation 4)}$$

where, as shown in FIG. 5, $h_1$ is the counterbalance height, t is the substrate thickness, L is the diameter of the mirror portion of the structure, and w is the counterbalance width. Thus there is a wide variation of acceptable dimensions of the counterbalance that will result in a structure that exhibits substantially no geometric form change with a large change in temperature.

Figure 7:
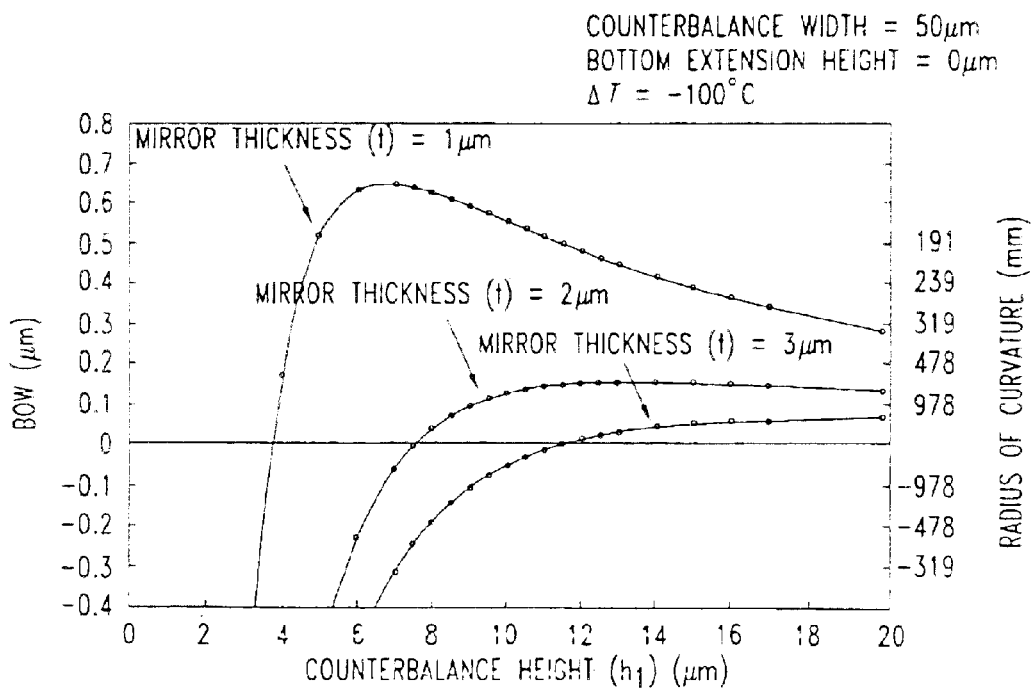
FIG. 7 shows a graph of the bow/radius of curvature of the structure of FIG. 5 as a function of counterbalance height and mirror thickness.

FIG. 7 shows a graph of the bow and corresponding radius of curvature of a structure as a function of counterbalance height ($h_1$ in FIG. 5) and mirror thickness (t in FIG. 5). This graph represents the case where the counterbalance width (w in FIG. 5) is 50 µm, the bottom extension height ($h_2$ in FIG. 4) is zero, and the temperature change is −100° C. Once again, there are several acceptable counterbalance heights that, depending on the thickness t of the mirror, will result in a structure with substantially no geometric form change. FIG. 7 also demonstrates the sensitivity of the micromirror curvature to the deviation of the counterbalance height from the optimal, zero curvature value. This information is valuable in considering the structure manufacturing techniques, since it indicates the geometrical accuracy that needs to be attained to achieve a desired amount of curvature.

Figure 8:
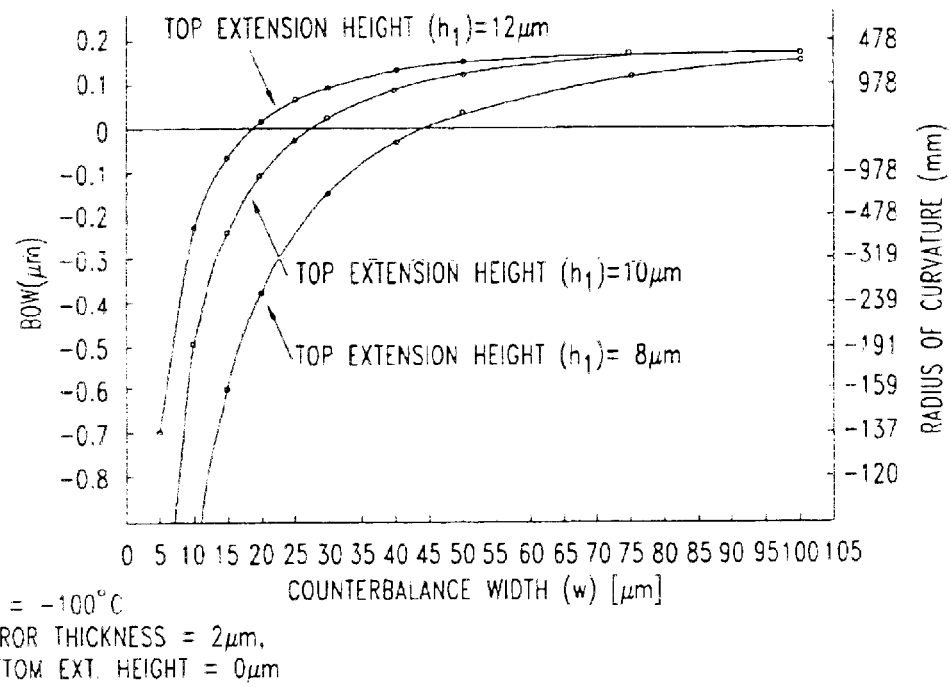
FIG. 8 shows a graph of the bow/radius of curvature of the structure of FIG. 5 as a function of counterbalance width and counterbalance height.

FIG. 8 shows the bow and radius of curvature that result given a constant mirror thickness of 2 µm, a change in temperature of −100° C. and no bottom extension ($h_2$ in FIG. 4 equals zero). Referring to the graph, for top extension heights ($h_1$ in FIG. 5) of 12 µm, 10 µm, 8 µm and 6 µm, there are several corresponding counterbalance widths (w in FIG. 5) that will achieve a given acceptable radius of curvature. Graph 801 also shows that, for a larger counterbalance height ($h_1$), there is a wider range of counterbalance widths (w) that will result in an acceptable radius of curvature.

Figure 9:
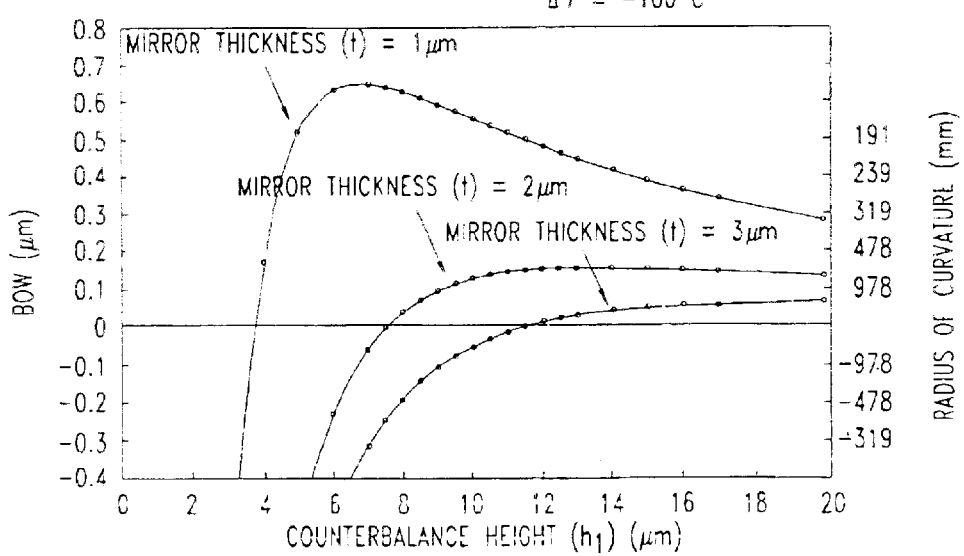
FIG. 9 shows a graph of the bow/radius of curvature of the structure of FIG. 5 as a function of counterbalance width and counterbalance height for two different values of temperature change.

FIG. 9 shows that the counterbalance height ($h_1$ in FIG. 5) required to achieve a particular bow/radius of curvature is independent of the temperature change. For this example, the counterbalance width (w in FIG. 5) is a constant 50 μm, the bottom extension ($h_2$ in FIG. 4) is zero, and the mirror thickness is 3 μm. This graph shows that a counterbalance height of 11.5 μm will provide a bow-free structure at the temperature change of −200° C. as well as −100° C.

The foregoing describes with particularity various arrangements and dimensions of structures for which the geometric form of the structures is retained (e.g., the structure remains flat) upon a temperature change or other stress-causing event. Other functionally equivalent arrangements of the counterbalancing structure may be apparent to one skilled in the art such as, for example, a series of interconnected segmented structures arranged symmetrically around the perimeter of the mirror structure. Additionally, the dimensions of the above-described embodiments could be altered by one skilled in the art in accordance with the disclosed principles to intentionally cause a geometric form change different from the original geometric form. Generally, one may change the counterbalance dimensions in a way such that a predetermined amount of bowing is achieved for a given temperature change. For example, compared to the counterbalanced mirror structure with a neutral plane that prevents any bowing, a smaller counterbalance structure will lower the neutral plane in the y-direction. As a result, for a decrease in temperature, a specific amount of bowing will result. This bowing will be proportional to the distance d in Equation 1 between the neutral plane and the center of mass of the structure. This may be useful, for example, to thermally vary the focal point of a layered micromirror structure in a desired manner by changing the temperature of the structure by a known amount. Other uses of such a predetermined form change will be obvious to one skilled in the art.

There are several techniques available for creating layered micromirrors with a counterbalancing structure or structures and a reflective mirror surface on a substrate. These techniques generally follow a series of steps as set forth in the flowchart of FIG. 10. At step 1001, a silicon-on-insulator (SOI) wafer is etched to define at least one desired structure such as, for instance, a mirror substrate or a counterbalance structure. At step 1002, a conformal layer of a masking material, such as silicon oxide material is deposited onto the etched SOI. At step 1003, vias are etched into the conformal silicon oxide layer to expose desired portions of the SOI wafer. At step 1004, a suitable material, such as polysilicon, is deposited over a predefined area to achieve another predefined, desired structure (e.g., a counterbalance structure or a mirror substrate). Alternatively to step 1004 a selective epitaxial growth can be employed to achieve the same result. At step 1005, excess silicon and silicon oxide are etched away to free the finished micromirror and, finally, at step 1006 a reflective layer is deposited onto the surface of the micromirror. The order of the foregoing steps are merely illustrative in nature and it will be obvious to one skilled in the art that the order of these steps may be varied.

Figure 10:
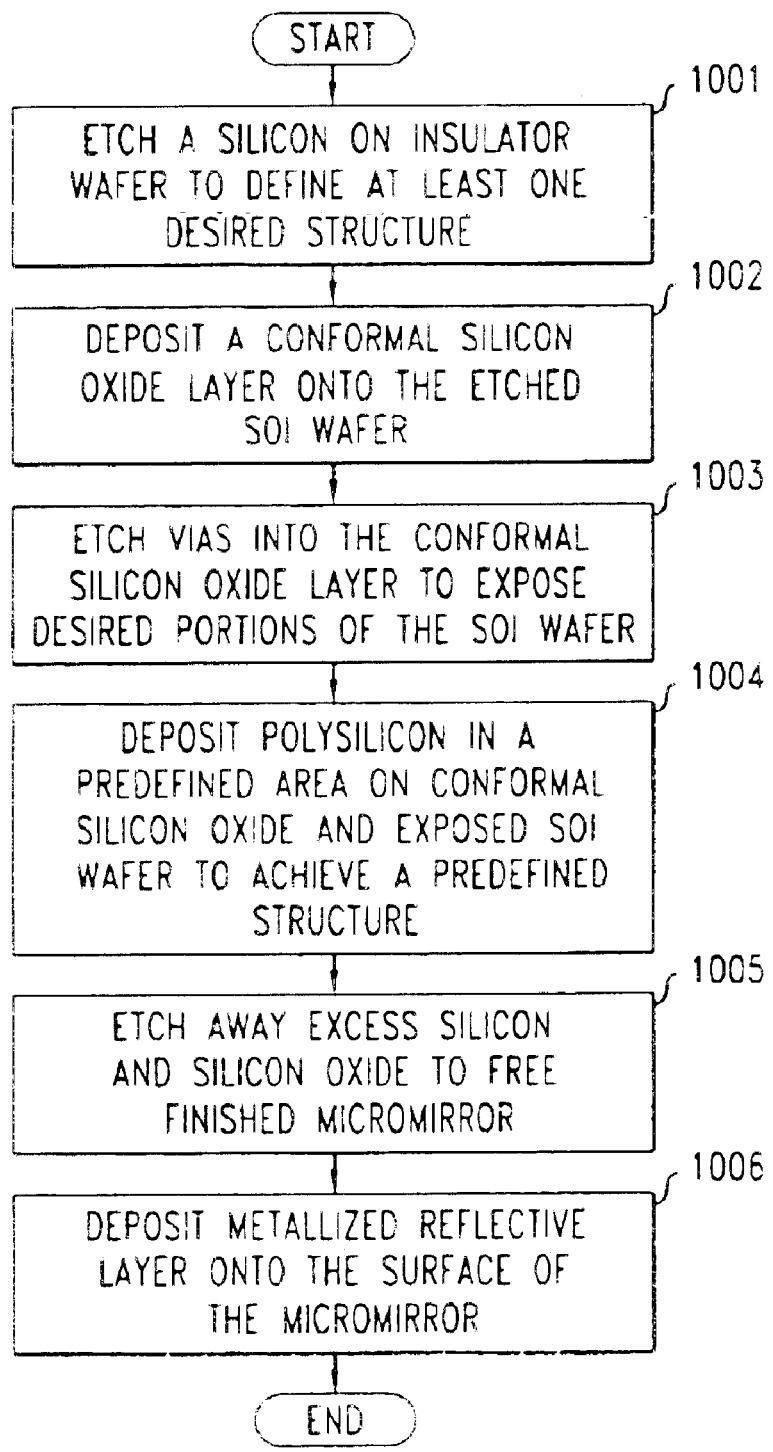
FIG. 10 shows the general steps of a method of producing a layered micromirror in accordance with the present invention.
Figure 11:
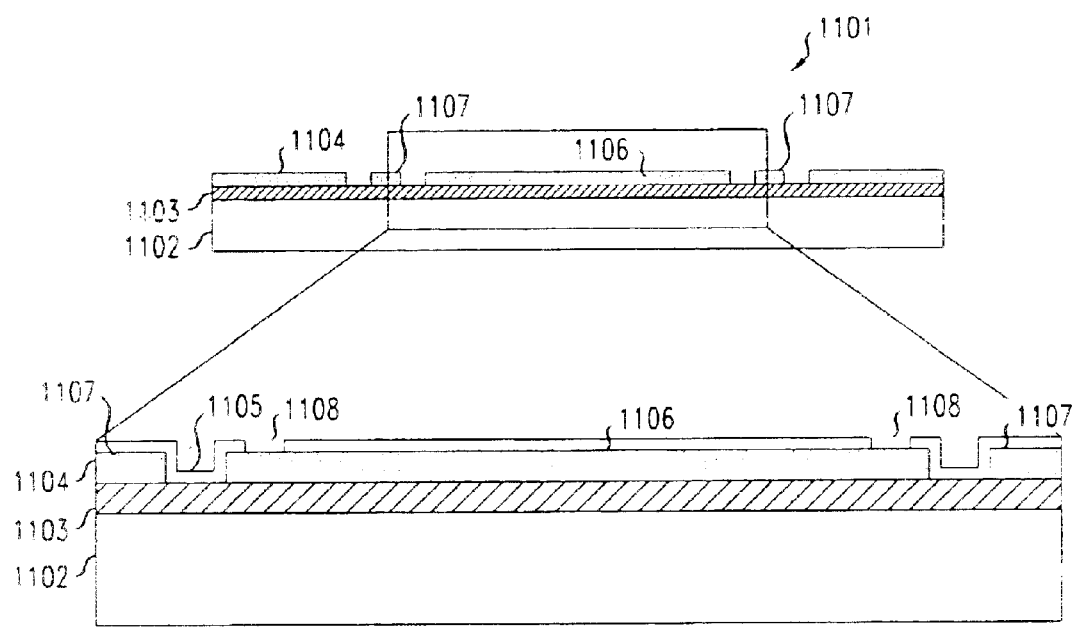
FIG. 11 shows a depiction of the specific steps of a first method of producing a layered micromirror in accordance with the present invention.

Three specific methods of manufacturing micromirrors in accordance with the process of FIG. 10 are considered advantageous. For example, in a first technique exemplified in FIGS. 11, 12, 13 and 14, a silicon-on-insulator wafer is used as a starting substrate material. Referring to FIG. 11, wafer 1101 may consist of a thin single crystal silicon film (active silicon) 1104 bonded on top of a thin buried oxide 1103 grown on a thick handle silicon wafer 1102. The active silicon film 1104 is initially etched to form the mirror structure 1106 and surrounding support structures, such as springs 1107. A conformal silicon oxide layer 1105 is then blanket deposited above the patterned active silicon layer 1104. Vias 1108 are etched into layer 1105 down to the portions of the surface of mirror 1106 where counterbalancing structurees are desired.

Figure 12:
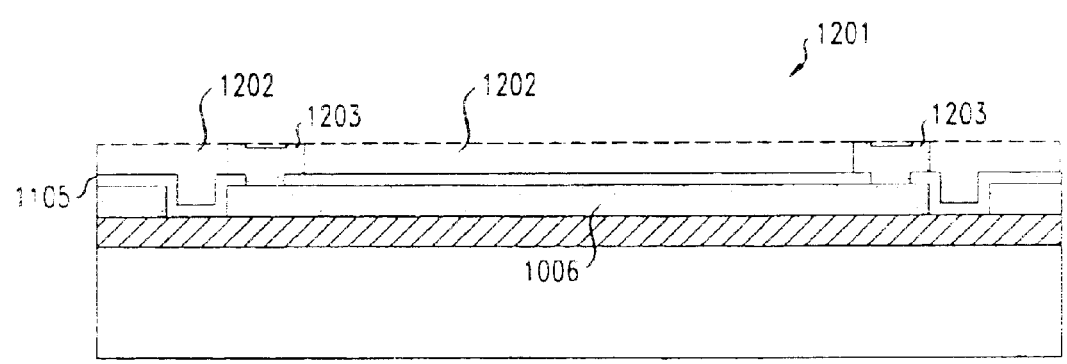
FIG. 12 shows a continuation of the depiction of the specific steps of a first method of producing a layered micromirror in accordance with the present invention.
Figure 13:
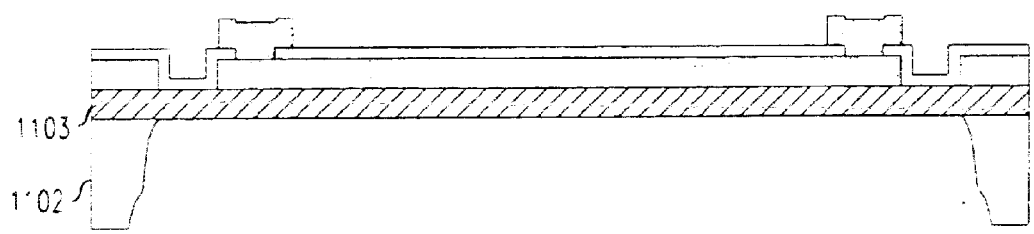
FIG. 13 shows a further continuation of the depiction of the specific steps of a first method of producing a layered micromirror in accordance with the present invention.
Figure 14:
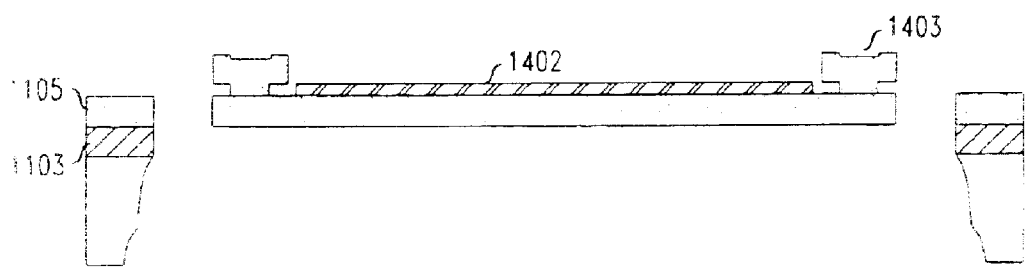
FIG. 14 shows a depiction of the final steps of a first method of producing a layered micromirror in accordance with the present invention.

Referring to FIG. 12, a polysilicon layer 1202 is blanket deposited onto layer 1105 and is etched back, using well-known techniques, to leave counterbalance structures 1203 affixed to mirror structure 1106. Next, as shown in FIG. 13, silicon layer 1102 is etched away exposing oxide layer 1103. FIG. 14 shows the final step wherein reflective layer 1402 is disposed on mirror 1106. This layer 1402 is only intended to be illustrative and, in fact, may be formed by layering one or more different layers of metallized or nonmetallized material. Oxide layer 1103 and polysilicon layer 1105 are removed, thereby freeing finished mirror structure 1403.

Figure 15:
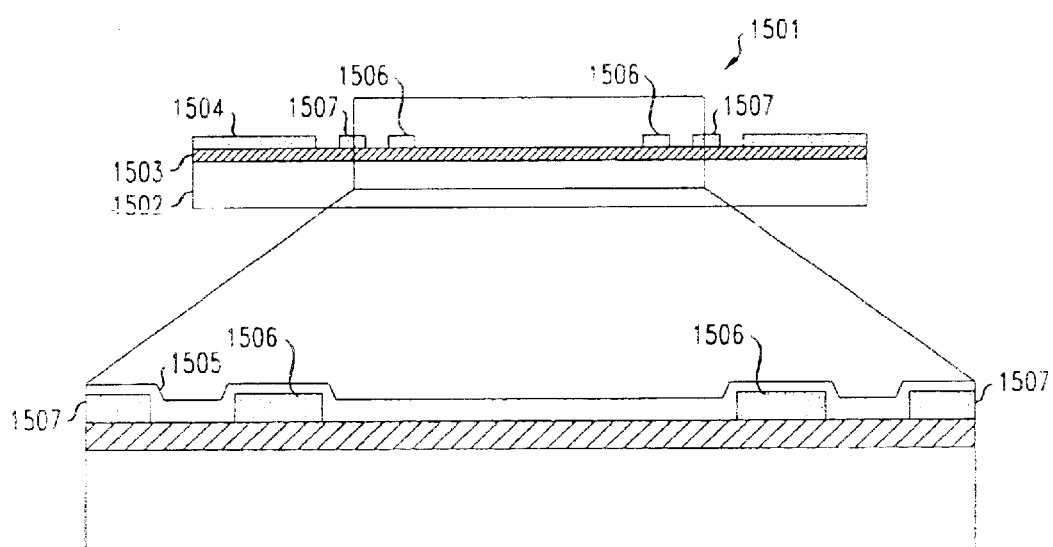
FIG. 15 shows a depiction of the specific steps of a second method of producing a layered micromirror in accordance with the present invention.
Figure 16:
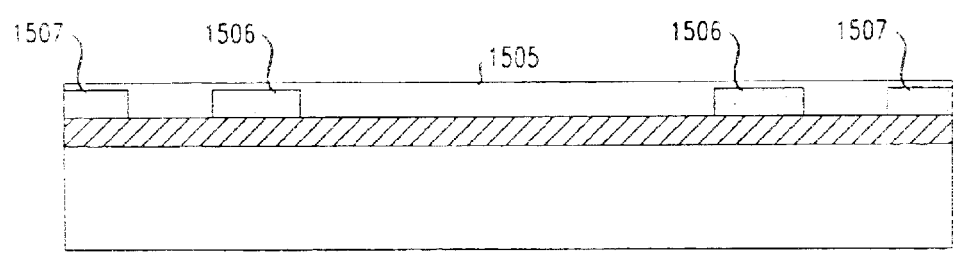
FIG. 16a shows a continuation of the depiction of the specific steps of a second method of producing a layered micromirror in accordance with the present invention.
FIG. 16b shows a further continuation of the depiction of the specific steps of a second method of producing a layered micromirror in accordance with the present invention.
Figure 16:
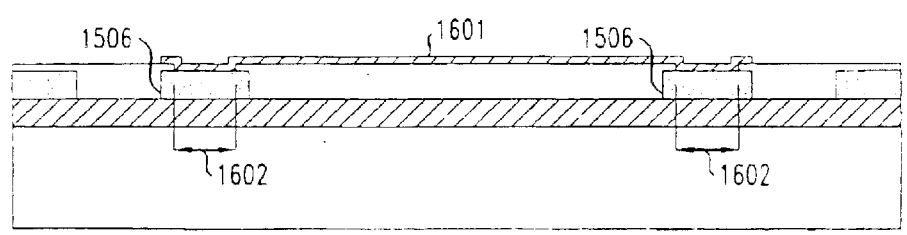
Figure 17A:
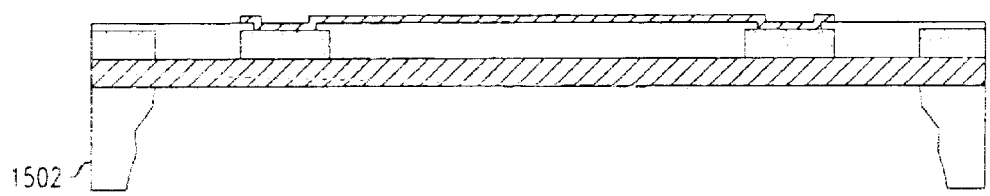
FIG. 17a shows an additional further continuation of the depiction of the specific steps of a second method of producing a layered micromirror in accordance with the present invention.
Figure 17B:
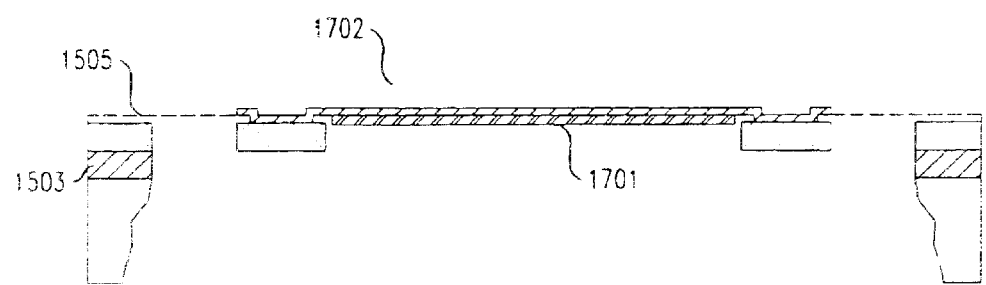
FIG. 17b shows a depiction of the final steps of a second method of producing a layered micromirror in accordance with the present invention.

FIGS. 15, 16a, 16b, 17a and 17b show a second method of manufacturing micromirrors with the same functionality as those illustrated above. Referring to FIG. 15, a silicon-on-insulator wafer 1501 is used as a starting substrate material. Once again, this wafer may consist of a thin single crystal silicon film (active silicon) 1504 bonded on top of a thin buried oxide 1503 grown on a thick handle silicon wafer 1502. The active silicon film 1504 is initially etched to form the counterbalancing structures 1506 and surrounding support structures, such as springs 1507. A conformal silicon oxide layer 1505 is then blanket deposited above the patterned active silicon layer 1504. The necessary thickness for this silicon oxide layer 1505 depends on the prior topography of the wafer. That is, the oxide must be thick enough to completely fill in any recess areas in the wafer. As depicted in FIG. 16a, layer 1505 is then etched and chemically mechanically polished using well known techniques to flatten and smooth the surface of layer 1505. Referring to FIG. 16b, selected areas of layer 1505 are etched back, creating via 1602 that expose portions of the surface of counterbalance rings 1506. After this etch, a polysilicon mirror membrane 1601 is formed using well known deposition techniques. This mirror membrane 1601 is integrally connected to the counterbalancing structure 1506 at specific locations where the via 1602 are cut. Finally, referring to FIG. 17a, a cavity is etched through the back of the substrate and, as shown in FIG. 17b, the mirror structure 1702 is coated with a reflective metallic coating 1701. Once again, this layer 1701 is only intended to be illustrative and, in fact, may be formed by layering one or more different layers of metallized or nonmetallized material. All the oxides of layers 1505 and 1503 are removed in a hydrofluoric acid solution, thereby freeing the finished mirror structure 1702.

Figure 18A:
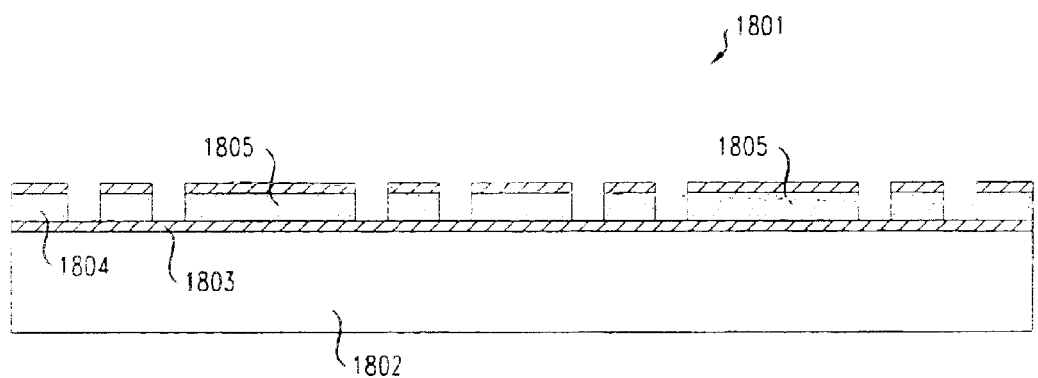
FIG. 18a shows a depiction of the specific steps of a third method of producing a layered micromirror in accordance with the present invention.
Figure 18B:
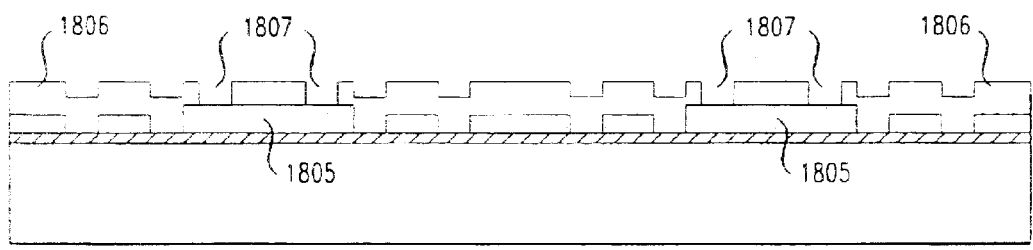
FIG. 18b shows a continuation of the depiction of the specific steps of a third method of producing a layered micromirror in accordance with the present invention.

FIGS. 18a, 18b, 19a and 19b show the steps of a third alternative method of fabricating micromirrors in accordance with the foregoing characteristics. In this method, referring to FIG. 18a, a silicon-on-insulator wafer 1801 is once again used as the starting substrate. As previously described, the wafer may consist of a thin single crystal silicon layer (active silicon) 1804 bonded on top of a thin buried oxide layer 1803 grown on a thick handle silicon wafer 1802. Next, selected areas of layer 1804 are etched back in order to define individual mirror substrates 1805. Referring to FIG. 18b, a conformal silicon dioxide layer 1806 is then blanket deposited above the patterned active silicon film 1804. Layer 1806 is deposited such that its depth is the same as the desired height of the counterbalance structurees, as described below. Specified areas of layer 1806 are then etched down to the aforementioned mirror substrates 1805 in order to form counterbalance cavities

Figure 19A:
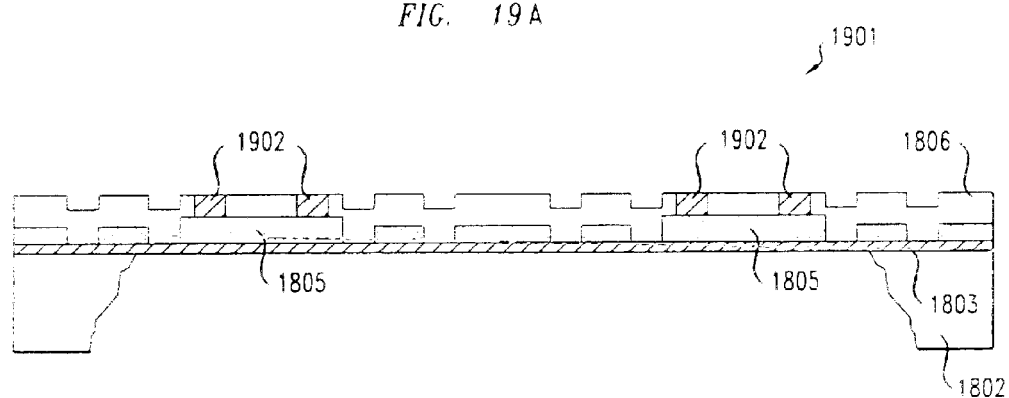
FIG. 19a shows a further continuation of the depiction of the specific steps of a third method of producing a layered micromirror in accordance with the present invention.
Figure 19B:
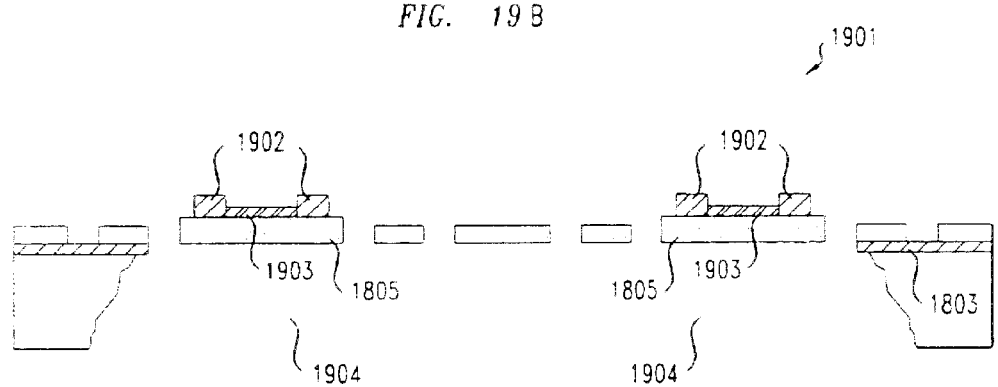
FIG. 19b shows a depiction of the final steps of a third method of producing a layered micromirror in accordance with the present invention.

1807. Referring to FIGS. 19*a* and 19*b*, silicon counterbalance structure 1902 is grown onto the mirror surfaces 1805 via selective epitaxy deposition of silicon. Then, wafer layers 1802, 1803 and 1806 are thinned and etched away to release the complete mirror structures. The foregoing merely illustrates the principles of the invention. The mirror surfaces 1805 may be coated with reflective layer 1903 of, for example, gold or aluminum to enhance the reflectivity of the mirror structure. As before, this layer 1903 is only intended to be illustrative and, in fact, may be formed by one or more different layers of metallized or nonmetallized material.

The foregoing merely illustrates the principles of the invention. It will thus be appreciated that those skilled in the art will be able to devise various arrangements that, although not explicitly described or shown herein, embody the principles of the invention and are within its spirit and scope. Furthermore, all examples and conditional language recited herein are intended expressly to be only for pedagogical purposes to aid the reader in understanding the principles of the invention and are to be construed as being without limitation to such specifically recited examples and conditions. Moreover, all statements herein reciting aspects and embodiments of the invention, as well as specific examples thereof, are intended to encompass functional equivalents thereof.

What is claimed is:

1. A layered structure comprising:

a first layer of a first material, a second layer of a second material disposed on said first layer, and a counterbalancing structure disposed in a way such that a first neutral plane is located at the position of the surface where said second layer is joined to said first layer.

2. The layered structure of claim 1 wherein the coefficient of thermal expansion of the first layer is different from the coefficient of thermal expansion of the second layer.

3. The layered structure of claim 1 wherein said predetermined position relative to said first layer and said second layer wherein a predetermined change in geometric form results.

4. The layered structure of claim 1 wherein said first layer is a silicon substrate.

5. The layered structure of claim 1 wherein said second layer is a layer of reflective material.

6. The layered structure of claim 1 wherein said layered structure is a micromirror.

7. The layered structure of claim 1 wherein upon a known temperature variation the radius of curvature of said layered structure varies by a known amount.

8. The layered structure of claim 1 wherein said counterbalancing structure is a contiguous ring disposed substantially along the periphery of said structure.

9. A layered structure comprising:

a first layer of a first material, a second layer of a second material disposed on said first layer, and a counterbalancing structure disposed in a way such that a first neutral plane is located at a predetermined position relative to said first layer and said second layer, wherein said counterbalancing structure is a part of said first layer.

10. A layered structure comprising:

a first layer of a first material, a second layer of a second material disposed on said first layer, and a counterbalancing structure disposed in a way such that a first neutral plane is located at a predetermined position relative to said first layer and said second layer, wherein said counterbalancing structure is a separate structure disposed on said first layer.

* * * * *